INVENTOR.
M. E. McCLELLAN
ATTORNEYS

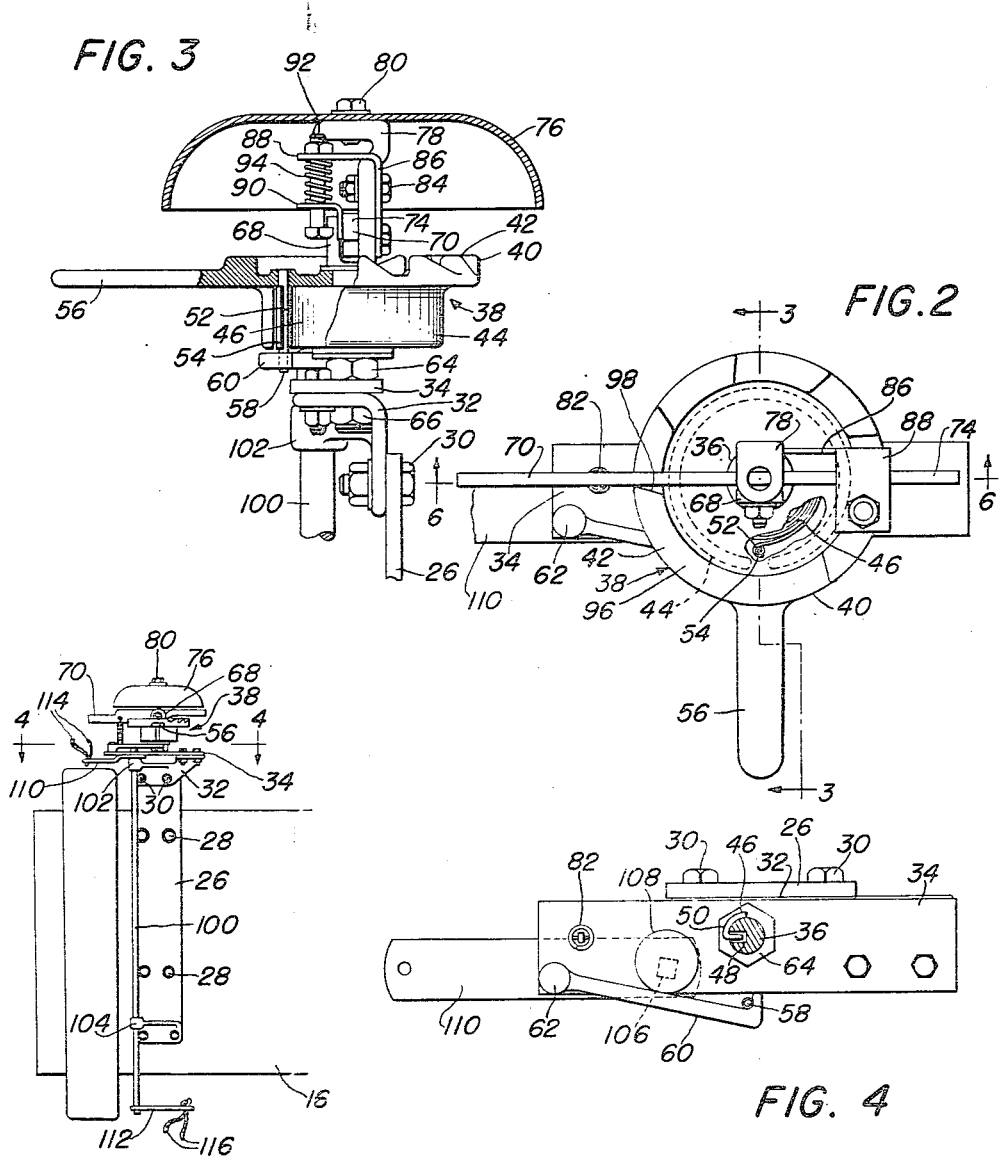

United States Patent Office 2,781,018
Patented Feb. 12, 1957

2,781,018

BALER TIER SIGNAL

Marcus E. McClellan, Ottumwa, Iowa, assignor to Deere Manufacturing Co., Dubuque, Iowa, a corporation of Iowa Application October 26, 1953, Serial No. 388,376

7 Claims. (Cl. 116—67)

This invention relates to an alarm or signal and more particularly to such device for an agricultural baler.

The average agricultural baler is a mobile machine, propelled over a field of windrowed crops by an arigcultural tractor and having many moving parts, including pickup means for gathering the windrows, baling means for forming the picked up crops into bales and tying mechanism for tying the completed bales. The accumulated mechanism is considerably noisy as well as being relatively complicated and normally requires all the attention of the operator to see that it is performing efficiently. Some balers use wire and others twine as the tying strand medium for tying the completed bales and in either case the strand is supplied in one or more coils or balls, each of which is carried in a container and the strand is fed to the tying mechanism via an opening in the container. The size of the coil or ball will obviously determine the length of strand that it will contain and the length of the strand obviously determines the time of ultimate consumption thereof by the tying mechanism. Since the usual pickup baler is automatic, the tying mechanism may well continue even in the absence of a tying strand, with the result that formed but untied bales are discharged out upon the field. It is therefore desirable that some form of signal, preferably audible, be provided either as standard equipment on or an attachment for a typical baler.

Although many balers are equipped with internal combustion engines for driving certain of the mechanisms, few of these engines use batteries for ignition, and it is therefore impracticable to utilize a signal or alarm that depends upon electrical energy for its operation.

Therefore, it is one of the principal objects of the present invention to provide an improved form of mechanical alarm, preferably one operated by a spring-wound motor. It is an important object of the invention to provide the alarm in the form of an attachment that can be readily mounted on existing balers with a minimum of modification of baler structure. It is a further object of the invention to achieve an alarm that operates in response to the ultimate consumption of any one of a plurality of coils or balls of tying strand, and to this end but a single alarm is used even though the baler, as is usual, uses as many as four balls or coils of wire or twine. This object is accomplished by the provision of a single actuating member having thereon a plurality of actuators connectible respectively to the strands of the respective sets of coils or boxes.

The foregoing and other important objects and desirable features inherent in and encompassed by the invention will become apparent as a preferred embodiment of the invention is disclosed in the following detailed description and accompanying sheets of drawings in which Fig. 1 is an elevational view of the alarm.

Fig. 2 is a plan view with the gong removed.

Fig. 3 is a section substantially on the line 3—3 of Fig. 2.

Fig. 4 is a section substantially on the line 4—4 of Fig. 1 but drawn to the scale of Figs. 2 and 3.

Figure 5:
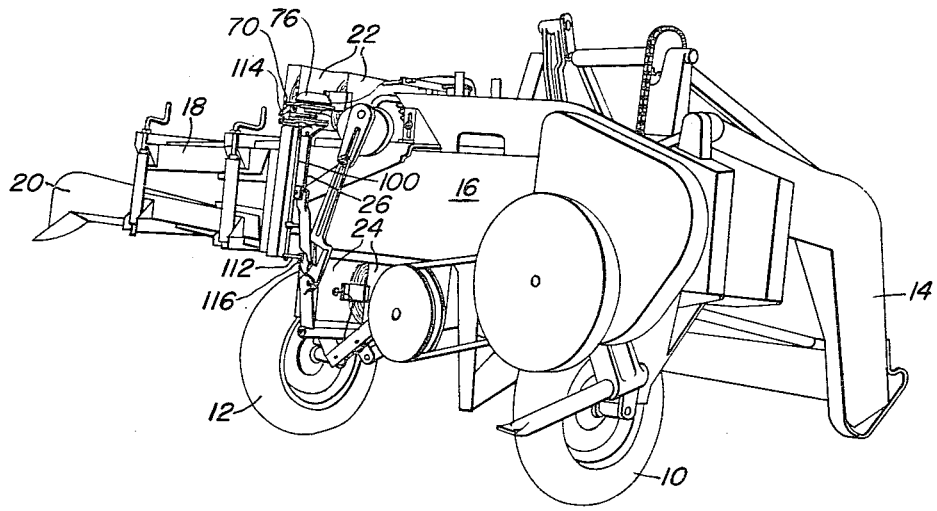
Fig. 5 is a perspective view of a rear portion of a baler showing the alarm of Fig. 1 installed thereon.

Reference will be had first to Fig. 5 for an over-all picture of the baler and the association therewith of the improved alarm. As shown in this figure, the baler comprises a mobile frame mounted on right- and left-hand wheels 10 and 12 and including a forwardly disposed pickup mechanism 14 which operates in the conventional manner to pick up windrowed crops and deliver them rearwardly to a bale case 16. Appropriate baling mechanism, not shown, operates to form the picked up crops into bales and to discharge the bales at the left-hand end of the machine via a bale case extension 18, whence the bales are discharged by a chute or tail board 20 to the ground for ultimate gathering by hand or by a bale loader. In some cases, the bales are discharged directly to a trailer towed behind the baler, all of which is rather conventional and is of no significance here.

The baler chosen for the purposes of illustration is of a well-known commercial type that utilizes wire as the tying strand. As is the case in most balers, each bale is tied with a pair of bands of wire and for this reason the baler includes a pair of upper wire boxes or containers 22 and a pair of lower boxes or containers 24. A representative type of baler is disclosed in the U. S. patent to McClellan 2,612,099. Wire-tying mechanism is illustrated in the U. S. patent to Tuft 2,512,754 and representative containers or strand-holding boxes appear in the U. S. patent to Hill 2,477,059.

As shown in Fig. 1, for example, the alarm comprises a main support 26 having means such as bolts 28 for the affixation thereof to the bale case 16. The support, for reasons that will be brought out later, is preferably mounted on the bale case so that it assumes the vertical position shown in Figs. 1, 3, 5 and 6. The upper end of the support has rigidly secured thereto, as by bolts 30, a bracket 32 on which is rigidly mounted a horizontal strap 34, all of which comprises part of the suport 26. Rising from the strap 34 is an upright spindle 36 on which is mounted a spring motor designated generally by the numeral 38. This motor comprises a driving member 40 having an upper portion in the form of a ratchet 42 and a lower housing portion 44 in the form of a concentric annulus of inverted cup shape to house energy-storing means in the form of a coiled torsion spring 46. A portion of the spindle 36 has therein a radial slot 48 (Fig. 4) in which one end 50 of the spring 46 is anchored. The other end of the spring has thereon a hook 52 (Fig. 2) which hooks about or anchors on a pin 54 carried by the driving member 40. The upper portion of the driving member includes an integral handle 56 which provides means for winding up the motor by angular movement of the driving member 40 in one direction so that the spring 46 can store energy to drive the driving member in the opposite direction.

Figure 6:
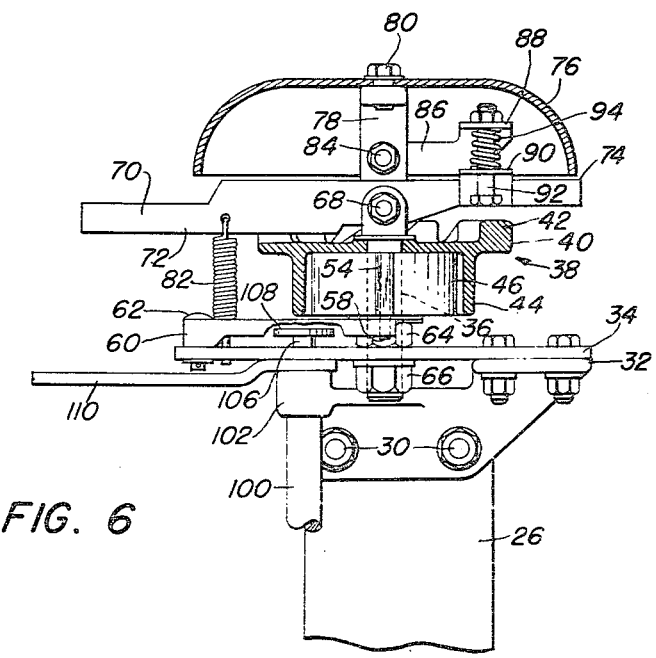
Fig. 6 is a sectional view taken on the line 6—6 of Fig. 2.

The pin 54 that secures the hooked end 52 of the spring 46 projects downwardly beyond the lower peripheral edge of the housing 44 and serves as a lock member 58 and thus is part of releasable means including a latch or sear 60. The sear is pivoted at 62 on the strap 34 and has a hooked end selectively engageable with or releasable from the locking member 58 established by the lower end of the anchor pin 54. Hence, when the driving member 40 is rotated in a clockwise direction, the spring 46 will be wound and the sear 60 will become engaged with the pin 58 to hold the motor against release or unwinding. The spindle 36 is appropriately mounted on the strap 34 as by means of upper and lower jam nuts 64 and 66 and includes rigidly intermediate its ends, just above the spring motor 38, means providing a bearing or pivot 68 on an axis normal to the axis of the spindle. This bearing serves to mount thereon a clapper 70 having at one side of the axis 68 an under portion 72 and at the other side of the axis an upper portion 74, these portions being of course, diametrically opposed and cooperative respectively with the ratchet teeth 42 and with a gong shell 76. This shell, as appears in Figs. 3 and 6, is in the form of an inverted cup and is arranged in umbrella fashion over the spring motor and clapper, being mounted on an integral upward extension 78 of the spindle and removably secured to this extension by a cap screw 80. The umbrella-like relationship of the gong to the parts below it is important from the standpoint of keeping these operating parts at least fairly free from dust and chaff that is inevitable in the operation of the baler. Moreover, the housing of the spring 46 in the inverted cup-shaped housing 44 of the spring motor is another feature that affords similar results.

The end of the clapper 70 at which the portion 72 is provided is normally urged downwardly by biasing means in the form of a relatively light compression spring 82 connected between the clapper 70 and the proximate end of the strap 34. The upward extension 78 of the spindle 36 has rigidly fixed thereto, as by a bolt 84, a radial arm 86 provided with an apertured flange 88.

The end of the clapper 70 at which the portion 74 is formed has rigid thereon an apertured flanged ear 90 through which extends a bolt 92. This bolt also extends through the apertured flange 88 and a cushioning or rebound spring 94 is carried by the bolt between the ears or flanges.

From the description thus far, it will be seen that after the spring motor is wound and then released by releasing the sear 60 from the lock member or pin 58, unwinding of the motor will cause counterclockwise rotation of the driving member 40, whereupon the teeth on the ratchet portion 42 will cause the clapper 70 to oscillate or rock rapidly as the teeth ride under the clapper portion 72, resulting in rapid upward and downward movement of the opposite end 74 of the clapper, which end, of course, strikes the gong. Fig. 2 illustrates the position of the driving member 40 when it is fully wound, it being understood that in the particular design shown it is not necessary that the member 40 rotate through more than approximately 270° to sound the gong. The ratchet portion 42 has a flat arcuate upper portion 96 of somewhat over 90° in extent, which extends from the clapper (Fig. 2) to just to the right of the windup handle 56. The remainder of the ratchet 42 contains teeth, as illustrated, for causing oscillation of the clapper 70. This high portion 96 terminates at its left-hand end in an abrupt shoulder 98 which thus provides means for limiting the clockwise movement thereof, since when the shoulder 98 reaches the clapper 70 the clapper will merely ride on the high spot and it need no longer be held up by the operator against the tension of the spring 72.

Actuating means for controlling the sear 60 in response to consumption of the strands from the coils or balls in the boxes or containers 22 and 24 will now be described. This actuating means preferably takes the form of a single actuator or rockshaft 100 journaled on the support 26 on an upright axis by means of a pair of bearings 102 and 104, the upper bearing 102 preferably being formed as part of the upper bracket 32. The shaft 100 has its upper end of square cross section, as at 106 (Fig. 4), and keyed thereto via this section is an eccentric 108 normally having its low portion engaged with the sear 60 so that the sear is in a position to engage the pin or lock member 58 on the spring motor 38. When the shaft 100 is rocked in either direction, the eccentric 108 will displace the sear 60 and permit release of the pin 58, whereupon the loaded spring motor drives the driving member 40 in a counterclockwise direction to cause oscillation of the clapper and thus to sound the gong. In order that the shaft 100 may be rocked by ultimate consumption of any of the strands, the shaft has fixed thereto upper and lower arms 110 and 112. When the upper coils or balls are placed in the upper boxes 22, one end of each is threaded through the tying mechanism in the conventional manner and the opposite end of each is brought out and secured to the upper arm 110, as indicated at 114 in Fig. 1. The same is true of the opposite ends of the lower strands from the lower boxes 24, as indicated by the numeral 116 in Fig. 1. These connections are also visible in Fig. 5. It may be that one of the strands will be ultimately consumed before any of the others, but this is immaterial, since the first strand ultimately consumed will cause operation of the alarm, which is as it should be, since the bales cannot be tied with one bend.

Operation of the mechanism has been covered in the foregoing description and repetition will serve no useful purpose. Likewise, the several features of the invention have been elaborated; although, it will be understood that various features not specifically enumerated will undoubtedly occur to those versed in the art, as will numerous modifications and variations in the preferred embodiment of the invention illustrated, all of which may be achieved without departing from the spirit and scope of the invention.

What is claimed is:

1. For a baler having a horizontal bale case including upper and lower containers holding upper and lower coils of tying strand: a strand-consumption signal comprising: a support having means for affixation to the bale case; an upright spindle fixed to and rising from the support; a driving member journaled on the spindle for angular movement about the spindle and having an upper ratchet portion including teeth spaced circumferentially as respects the spindle, said member further including a concentric annular lower portion; a torsion spring housed in the lower portion and surrounding the spindle and having one end anchored to the spindle and its other end anchored to the driving member so that angular movement of the driving member in one direction winds up the spring to store energy for driving the driving member in the opposite direction; a gong mounted on the spindle in vertically spaced relation above the ratchet portion; a clapper positioned in the space between the gong and ratchet member and rockable on the spindle on an axis normal to the spindle and having an under portion at one side of said axis engageable with the ratchet teeth and an upper portion at the other side of said axis engageable with the gong so that spring-driven angular movement of the driving member causes the ratchet teeth to rock the clapper and sound the gong; a lock member fixed to the driving member; a sear movably mounted on the support for movement into and out of engagement with the lock member for holding and releasing the spring-loaded driving member; an upright rockshaft journaled on the support and having means fixed eccentrically thereto and engageable with the sear to selectively achieve holding and release of the sear as respects the locking member; and upper and lower arms fixed to the rockshaft respectively adjacent to the strand containers and adapted respectively to engage portions of the upper and lower strands so that ultimate consumption of a predetermined amount of either strand will rock the rockshaft via the associated arm to release the sear and cause sounding of the gong.

2. For a baler having a bale case including a pair of containers respectively holding a pair of coils of tying strand: a strand-consumption signal comprising: a support having means for affixation to the bale case; a driving member journaled on the support for angular movement about an axis and having at one side thereof a ratchet portion including teeth spaced circumferentially as respects said axis and at its other side a concentric annular housing portion; a torsion spring housed in the housing portion and having one end anchored to the support and its other end anchored to the driving member so that angular movement of the driving member in one direction winds up the spring to store energy for driving the driving member in the opposite direction; a gong mounted on the support in spaced relation to the ratchet portion; a clapper positioned in the space between the gong and ratchet member and movable alternately into and out of contact with the gong and further having a part engageable with the ratchet teeth so that spring-driven angular movement of the driving member causes the ratchet teeth to move the clapper and sound the gong; a lock member fixed to the driving member; a sear movably mounted on the support for movement into and out of engagement with the lock member for holding and releasing the spring-loaded driving member; and upright rockshaft journaled on the support and having means fixed eccentrically thereto and engageable with the sear to selectively achieve holding and release of the sear as respects the locking member; and upper and lower arms fixed to the rockshaft respectively adjacent to the strand containers and adapted respectively to engage portions of the strands so that ultimate consumption of a predetermined amount of either strand will rock the rockshaft via the associated arm to release the sear and cause sounding of the gong.

3. For a baler having a bale case including a pair of containers respectively holding a pair of coils of tying strand: a strand-consumption signal comprising: a support having means for affixation to the bale case; an upright spindle fixed to and rising from the support; a driving member journaled on the spindle for angular movement about the spindle and having an upper ratchet portion including teeth spaced circumferentially as respects the spindle, said member further including a concentric annular lower portion; a torsion spring housed in the lower portion and surrounding the spindle and having one end anchored to the spindle and its other end anchored to the driving member so that angular movement of the driving member in one direction winds up the spring to store energy for driving the driving member in the opposite direction; a gong mounted on the spindle in vertically spaced relation above the ratchet portion; a clapper positioned in the space between the gong and ratchet member and rockable on the spindle on an axis normal to the spindle and having an under portion at one side of said axis engageable with the ratchet teeth and an upper portion at the other side of said axis engageable with the gong so that spring-driven angular movement of the driving member causes the ratchet teeth to rock the clapper and sound the gong; a lock member fixed to the driving member; a sear movably mounted on the support for movement into and out of engagement with the lock member for holding and releasing the spring-loaded driving member; a rockshaft journaled on the support and having means fixed eccentrically thereto and engageable with the sear to selectively achieve holding and release of the sear as respects the locking member; and spaced arms fixed to the rockshaft respectively and adapted respectively to engage portions of the strands so that ultimate consumption of a predetermined amount of either strand will rock the rockshaft via the associated arm to release the sear and cause sounding of the gong.

4. For a baler having a bale case including a pair of containers respectively holding a pair of coils of tying strand: a strand-consumption signal comprising: a support having means for affixation to the bale case; a driving member journaled on the support for angular movement about an axis and having at one side thereof a ratchet portion including teeth spaced circumferentially as respects said axis and at its other side a concentric annular housing portion; a torsion spring housed in the housing portion and having one end anchored to the support and its other end anchored to the driving member so that angular movement of the driving member in one direction winds up the spring to store energy for driving the driving member in the opposite direction; a gong mounted on the support in spaced relation to the ratchet portion; a clapper positioned in the space between the gong and ratchet member and movable alternately into and out of contact with the gong and further having a part engageable with the ratchet teeth so that spring-driven angular movement of the driving member causes the ratchet teeth to move the clapper and sound the gong; a lock member fixed to the driving member; a sear movably mounted on the support for movement into and out of engagement with the lock member for holding and releasing the spring-loaded driving member; a rockshaft journaled on the support and having means fixed eccentrically thereto and engageable with the sear to selectively achieve holding and release of the sear as respects the locking member; and spaced arms fixed to the rockshaft respectively and adapted respectively to engage portions of the strands so that ultimate consumption of a predetermined amount of either strand will rock the rockshaft via the associated arm to release the sear and cause sounding of the gong.

5. For a baler having a bale case including means holding a supply of tying strands: a strand-consumption signal comprising: a support having means for affixation to the bale case; a driving member journaled on the support for angular movement about an axis and having at one side thereof a ratchet portion including teeth spaced circumferentially as respects said axis and at its other side a concentric annular housing portion; a torsion spring housed in the housing portion and having one end anchored to the support and its other end anchored to the driving member so that angular movement of the driving member in one direction winds up the spring to store energy for driving the driving member in the opposite direction; a gong mounted on the support in spaced relation to the ratchet portion; a clapper positioned in the space between the gong and ratchet member and movable alternately into and out of contact with the gong and further having a part engageable with the ratchet teeth so that spring-driven angular movement of the driving member causes the ratchet teeth to move the clapper and sound the gong; a lock member fixed to the driving member; a sear movably mounted on the support for movement into and out of engagement with the lock member for holding and releasing the spring-loaded driving member; an actuator movably carried on the support and having means connected thereto and engageable with the sear to selectively achieve holding and release of the sear as respects the locking member; and means on the actuator adapted to receive a portion of the strand so that ultimate consumption of a predetermined amount of the strand supply will cause the actuator to release the sear and cause sounding of the gong.

6. For a baler having a bale case including means holding a supply of tying strand: a strand-consumption signal comprising: a support having means for affixation to the bale case; a driving member journaled on the support for angular movement about an axis and having first and second opposite radial face portions, said first radial portion being provided with circumferentially spaced ratchet teeth and said second radial portion being in the form of a concentric annular housing; a torsion spring in the housing and having one end anchored to the support and its other end anchored to the driving member so that angular movement of the driving member in one direction winds up the spring to store energy for driving the driving member in the opposite direction; a gong mounted on the support in spaced relation to the ratchet portion; a clapper positioned in the space between the gong and ratchet member and mounted on an axis normal to the axis of the driving member for movement alternately into and out of contact with the gong and further having a part engageable with the ratchet teeth so that spring-driven angular movement of the driving member causes the ratchet teeth to move the clapper and sound the gong; a lock member fixed to the driving member; a sear movably mounted on the support for movement into and out of engagement with the lock member for holding and releasing the spring-loaded driving member; an actuator movably carried on the support and having means connected thereto and engageable with the sear to selectively achieve holding and release of the sear as respects the locking member; and means on the actuator adapted to receive a portion of the strand so that ultimate consumption of a predetermined amount of the strand supply will cause the actuator to release the sear and cause sounding of the gong.

7. For a baler having a bale case including means holding a supply of tying strand: a strand-consumption signal comprising: a support having means for affixation to the bale case; a driving member journaled on the support for angular movement about an axis and having first and second opposite radial face portions, said first radial portion being provided with circumferentially spaced ratchet teeth and said second radial portion being in the form of a concentric annular housing; a torsion spring in the housing and having one end anchored to the support and its other end anchored to the driving member so that angular movement of the driving member in one direction winds up the spring to store energy for driving the driving member in the opposite direction; a gong mounted on the support in spaced relation to the ratchet portion; a clapper positioned in the space between the gong and ratchet member and mounted on an axis normal to the axis of the driving member for movement alternately into and out of contact with the gong and further having a part engageable with the ratchet teeth so that spring-driven angular movement of the driving member causes the ratchet teeth to move the clapper and sound the gong; releasable means holding the spring-loaded driving member; and means connected to the releasable means and adapted to engage the strand so that ultimate consumption of a predetermined amount of the strand supply will cause said releasable means to release the driving member for sounding the gong.

References Cited in the file of this patent

UNITED STATES PATENTS

| | | |
|---|---|---|
| 317,905 | Whiting | May 12, 1885 |
| 475,960 | Brouillard | May 31, 1892 |
| 1,415,874 | Hickey | May 16, 1922 |
| 1,524,087 | Dorsey | Jan. 27, 1925 |
| 2,423,953 | Stratton | July 15, 1947 |
| 2,477,059 | Hill | July 26, 1949 |
| 2,609,786 | Turner | Sept. 9, 1952 |